US011132486B1

(12) United States Patent
Prasad et al.

(10) Patent No.: US 11,132,486 B1
(45) Date of Patent: Sep. 28, 2021

(54) SYSTEMS AND METHODS FOR MULTI-BIT MEMORY WITH EMBEDDED LOGIC

(71) Applicant: Taiwan Semiconductor Manufacturing Company Limited, Hsinchu (TW)

(72) Inventors: Guru Prasad, Austin, TX (US); Sachin Kumar, Austin, TX (US)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

(21) Appl. No.: 16/879,871

(22) Filed: May 21, 2020

(51) Int. Cl.
| | | |
|---|---|---|
| G06F 30/30 | (2020.01) | |
| G06F 30/337 | (2020.01) | |
| G06F 30/327 | (2020.01) | |
| G06F 30/392 | (2020.01) | |
| G06F 30/398 | (2020.01) | |
| G06F 30/394 | (2020.01) | |
| G06F 30/3308 | (2020.01) | |
| G06F 30/3312 | (2020.01) | |
| H03K 3/037 | (2006.01) | |
| G06F 111/20 | (2020.01) | |
| G06F 119/06 | (2020.01) | |
| G06F 119/12 | (2020.01) | |

(52) U.S. Cl.
CPC .......... *G06F 30/337* (2020.01); *G06F 30/327* (2020.01); *G06F 30/3308* (2020.01); *G06F 30/3312* (2020.01); *G06F 30/392* (2020.01); *G06F 30/394* (2020.01); *G06F 30/398* (2020.01); *G06F 2111/20* (2020.01); *G06F 2119/06* (2020.01); *G06F 2119/12* (2020.01); *H03K 3/0372* (2013.01)

(58) Field of Classification Search
CPC .............. G06F 30/327; G06F 30/3308; G06F 30/3312; G06F 30/337; G06F 30/392; G06F 30/394; G06F 30/398; G06F 2111/20; G06F 2119/06; G06F 2119/12; H03K 3/0372
See application file for complete search history.

(56) References Cited

U.S. PATENT DOCUMENTS

| | | | |
|---|---|---|---|
| 9,361,417 B2* | 6/2016 | Arunachalam | ....... G06F 30/392 |
| 10,641,822 B2* | 5/2020 | Balasubramanian | ....... |
| | | | G06F 30/327 |
| 10,706,193 B1* | 7/2020 | Van Campenhout | ....... |
| | | | G06F 30/3308 |

(Continued)

FOREIGN PATENT DOCUMENTS

DE          102019128996 A1     4/2020

OTHER PUBLICATIONS

German Office Action; Application No. 10 2020 115 968.4, dated Apr. 14, 2021, 12 pages, No Translation.

*Primary Examiner* — Leigh M Garbowski
(74) *Attorney, Agent, or Firm* — Jones Day

(57) ABSTRACT

Systems and method are provided that include a standard cell with multiple input and output storage elements, such as flip flops, latches, etc., with some combination logic interconnected between them. In embodiments, the slave latches on input flip flops are replaced with a fewer number latches at a downstream node(s) of the combination logic resulting in improved performance, area and power, while maintaining functionality at the interface pins of the standard cell. The process of inferring such a standard cell from a behavioral description, such as RTL, of a design or remapping equivalent sub-circuits from a netlist to such a standard cell is also described.

20 Claims, 13 Drawing Sheets

(56) References Cited

U.S. PATENT DOCUMENTS

| | | | |
|---|---|---|---|
| 11,055,463 B1* | 7/2021 | Prasad | ............... G06F 30/373 |
| 2003/0014612 A1* | 1/2003 | Joy | .................. G06F 9/4843 |
| | | | 712/215 |
| 2015/0227646 A1 | 8/2015 | Arunachalam et al. | |

* cited by examiner

SYSTEMS AND METHODS FOR MULTI-BIT MEMORY WITH EMBEDDED LOGIC

BACKGROUND

Electronic Design Automation (EDA) and related tools enable efficient design of complex integrated circuits which may have extremely large numbers of components (e.g., thousands, millions, billions, or more). Specifying characteristics and placement of all of those components (e.g., transistor arrangements to implement desired logic, types of transistors, signal routing) by hand would be extremely time consuming and expensive for modern integrated circuits, if not impossible. Modern EDA tools utilize cells to facilitate circuit design at different levels of abstraction. A cell in the context of EDA is an abstract representation of a component within a schematic diagram or physical layout of an electronic circuit in software. Circuits may be designed at a logical layer of abstraction using cells, where those circuits may then be implemented using lower level specifications (e.g., transistor arrangement, signal routing) associated with those cells.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
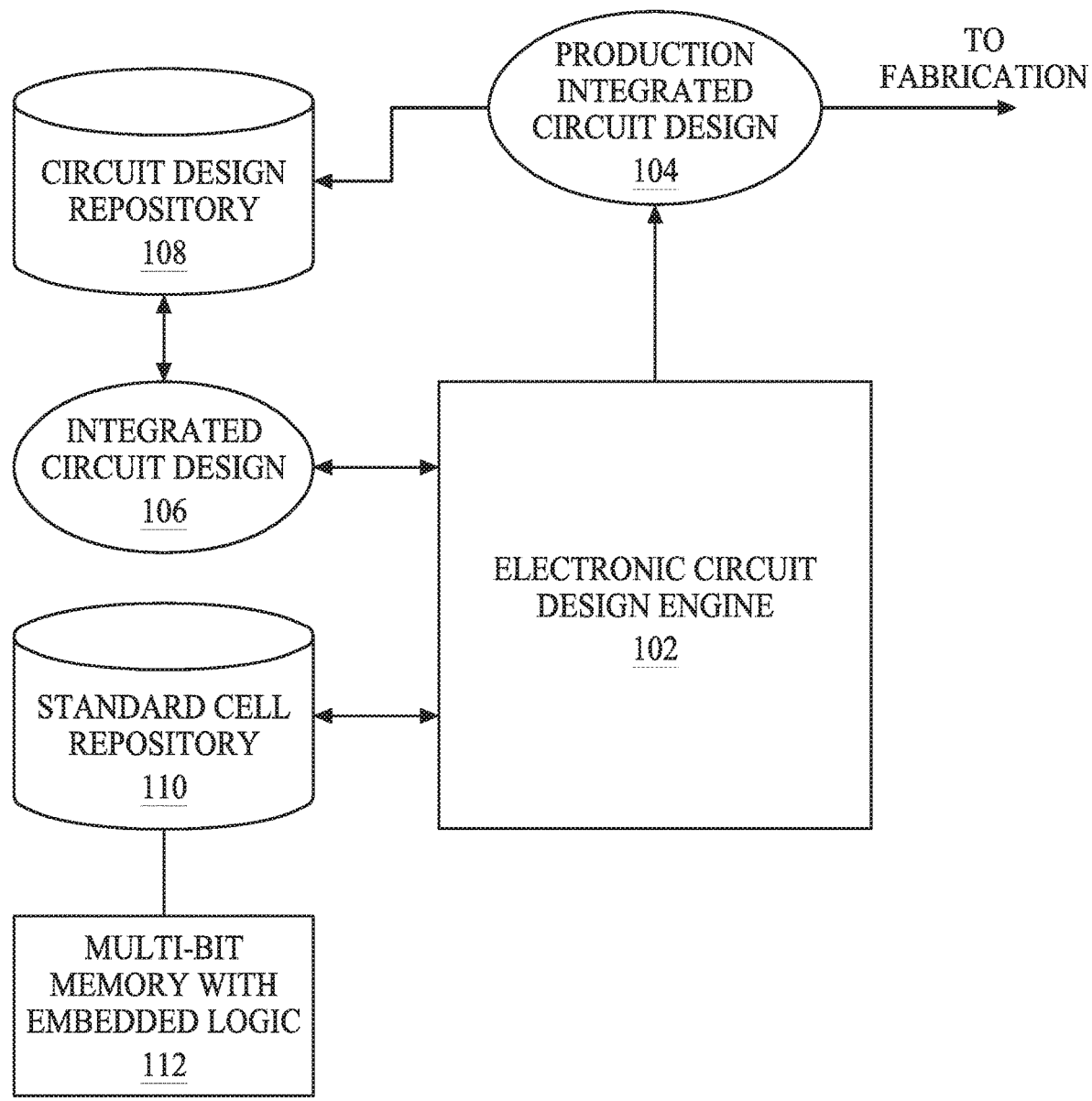
FIG. 1 is a block diagram depicting an electronic circuit design engine according to an exemplary embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An Integrated Circuit is a complex network of a very large number of components (e.g., transistors, resistors, capacitor) interconnected using the features of a process technology to realize a desired function. Manually design such a component is typically not feasible because of the number of steps involved and the amount of design information that needs to be processed. EDA tools may be used to assist the designers in this process. Due to the size and complex nature of the design process, the integrated circuit may be designed using a hierarchical approach where the design is broken down in smaller pieces which are assembled to form the complete chip. This process also helps in pre-designing commonly used sub-blocks and reusing them where needed. A standard cell library is one such collection of basic components (e.g., AND, OR, NAND, NOR, XOR, Flip-flops, Latches) that is commonly used by certain EDA tools to automate the generation of layout from a behavioral description of a block. Each piece of design may have an abstract representation for the various information that is needed to capture the design such as functional behavior, circuit description, physical layout, timing behavior, many of which are used by the EDA tools to assist in the design process.

EDA tools may include a library of standard cells associated with common circuit functions. For example, standard cells can be associated logic gates, such as an AND gate, an OR gate, an XOR gate, a NOT gate, a NAND gate, a NOR gate, and an XNOR gate, and circuits such as a multiplexer, a flip-flop, an adder, and a counter. Those standard cells can be arranged to realize more complex integrated circuit functions. When designing an integrated circuit having specific functions, standard cells may be selected. Next, designers, or EDA software, or ECAD (Electronic Computer-Aided Design) tools draw out design layouts of the integrated circuit including the selected standard cells and/or non-standard cells. The design layouts may be converted to photomasks. Then, semiconductor integrated circuits can be manufactured, when patterns of various layers, defined by the photomasks, are transferred to a substrate.

FIG. 1 is a block diagram depicting an electronic circuit design engine according to an exemplary embodiment. The electronic circuit design engine 102 facilitates development of a production integrated circuit design 104 that is used in the fabrication of a physical integrated circuit. The circuit design engine 102 receives or facilitates initial generation of an integrated circuit design 106 that may be developed (e.g., over a number of iterative revisions) and stored in a non-transitory circuit design repository 108, such as via interactions with a user interface or execution of automated scripts. For example, on request, the circuit design engine 102 may access or receive the integrated circuit design 106 in the form of a computer file, perform operations on the integrated circuit design 106, and then output a modified form of the design (e.g., as an integrated circuit design 106 file for storage in the design repository 108 or as a production integrated circuit design 104 (e.g., in the form of an EDA file, a netlist) for fabrication). The circuit design 106 may be made up of a plurality of components (e.g., resistors, capacitors, transistors logic gates, data signal lines), some or all of which take the form of cells. The integrated circuit design 106 may take are variety of forms, such as a behavioral model of a design in a register-transfer level (RTL) representation or a more hardware specific specification, such as a netlist. The circuit design engine 102 is responsive to one or more cell repositories (e.g., standard cell repository 110) that store data associated with standard cells that can be used as building blocks in the generation of integrated circuit designs 104, 106. Standard cells may take a variety of forms and represent a variety of functions (e.g., the operation of one or more logic gates), such as a multi-bit memory with embedded logic as depicted at 112.

Figure 2:
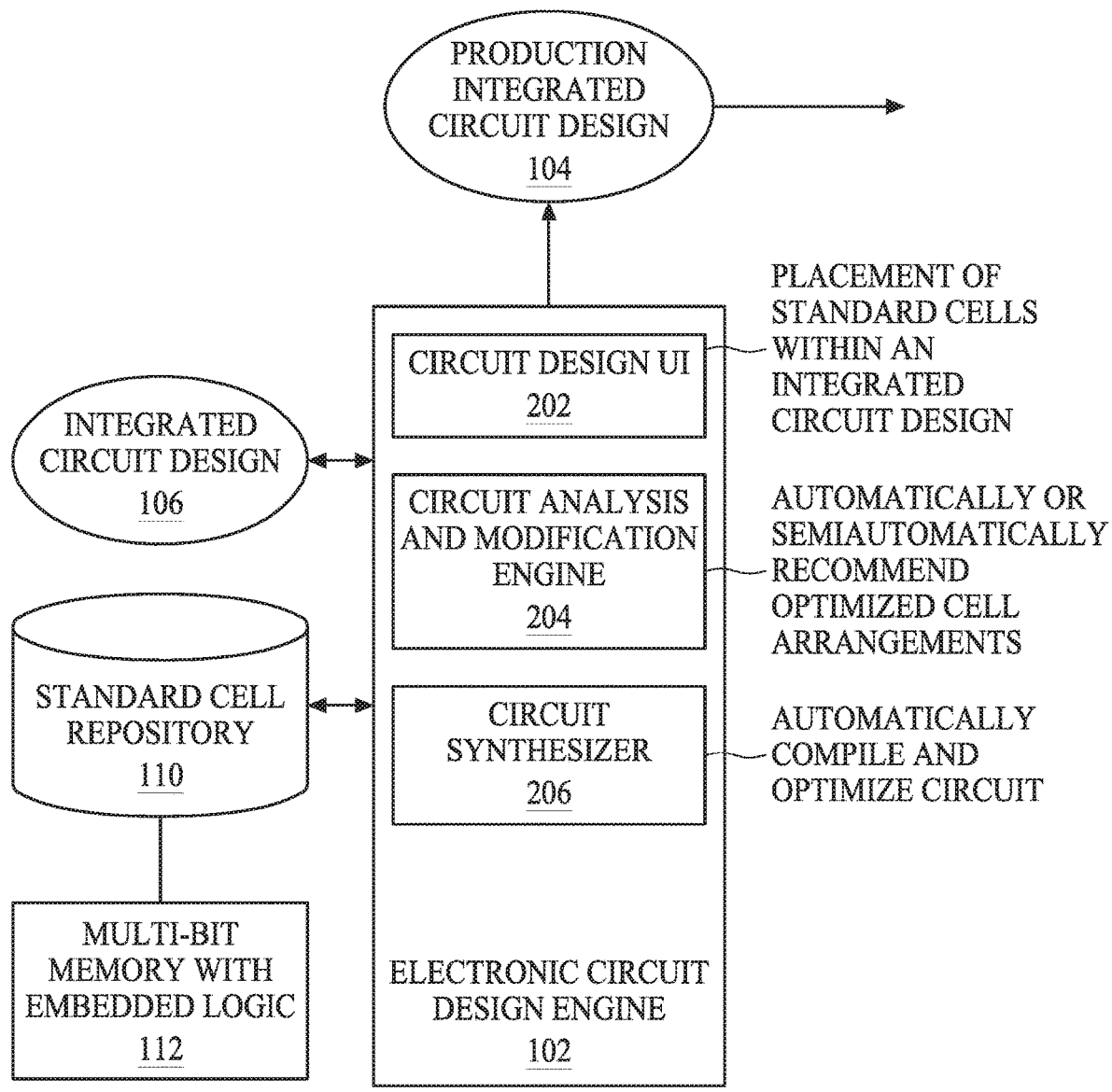
FIG. 2 is a block diagram depicting modules of a circuit design engine according to an exemplary embodiment.

Electronic circuit design engines may provide a variety of different circuit design functionality. FIG. 2 is a block diagram depicting modules of a circuit design engine according to an exemplary embodiment. An electronic circuit design engine 102 receives an integrated circuit design 106 via a file or commands that dictate the content of that design 106 entered via a mechanism such as a circuit design user interface 202. The interface 202 may display graphics or text describing an integrated circuit design and provide commands for building and manipulating the design. The circuit design engine 102 is further responsive to a standard cell repository 110 that stores standard cell data records like the one depicted at 112. The circuit design user interface 202 can provide controls for accessing standard cells from the repository 110 and integrating them into an integrated circuit design 106. Upon completion of an integrated circuit design 106, the design may be output from the engine 102 at 106 for saving in a non-transitory computer readable medium or as a production integrated circuit design 104 for fabrication of an integrated circuit.

Figure 3:
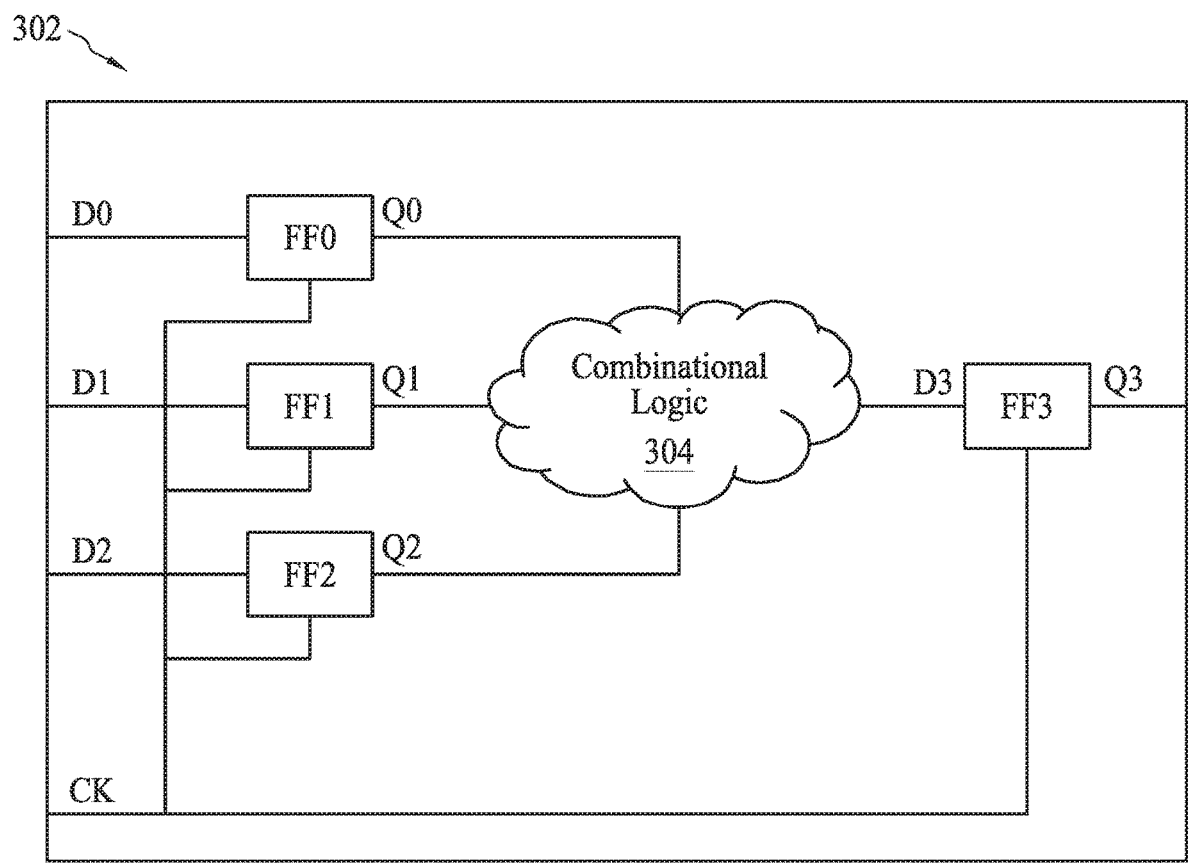
FIG. 3 depicts a logic representation of an embedded logic multi-bit flip flop standard cell in an exemplary embodiment.

FIG. 3 depicts a logic representation of an embedded logic multi-bit flip flop standard cell in an exemplary embodiment. The standard cell includes three data inputs, D0, D1, D2, a clock input CK, and provides a single data output Q3. The standard cell 302 logic includes a plurality of input flip flops FF0, FF1, FF2 for temporary storage of data provided on the input lines D0, D1, D2. The flip flops FF0, FF1, FF2 are responsive to the clock signal CK, such that they store data from the inputs according to the clock signal CK (e.g., on a rising edge or a falling edge of the click clock signal CK). The flip flop outputs Q0, Q1, Q2 are provided to combinational logic 304 that provides logic operation based on signals Q0, Q1, Q2 received from the flip flops FF0, FF1, FF2. The combinational logic may take a variety of forms of varying complexity, from a single logic gate (e.g., a 3-input AND gate, a 2 input multiplexer, multi-level cascading logic). In certain embodiments, the combinational logic 304 is limited to 1-3 levels of cascading, and in some instances 1-2 levels, so as to represent common logic functions likely to be frequently used in integrated circuits. In other examples, more than 3 levels of cascading are implemented. An output of the combinational logic 304 is provided to an output flip flop FF3, where that data is captured according to the clock CK signal. In one embodiment, data is received by the combinational logic 304 from the input flip flops FF0, FF1, FF2 at one rising or falling edge of the clock CK and captured, following processing by the combinational logic 304 at the output flip flop FF3 on the next edge or second falling edge of the clock CK signal.

Because standard cells are designed with frequent reuse in mind, more effort may be put into their optimization over a one-off circuit synthesis. Full circuit timing simulation may be used to validate timing within the standard cell, ensuring accuracy and enabling more aggressive designs. For example, transistors of a particular size in a particular arrangement with optimized routing may be selected within a standard cell to maximize power efficiency and speed. Standard cells may implement a wide variety of transistor arrangements. In one example, a standard cell utilizes pass transistor logic, which can eliminate redundant transistors that may be present (e.g., for margin). In one pass transistor logic example, transistors are used as switches to pass logic levels between nodes of a circuit, instead of as switches connected directly to supply voltages.

Figure 4:
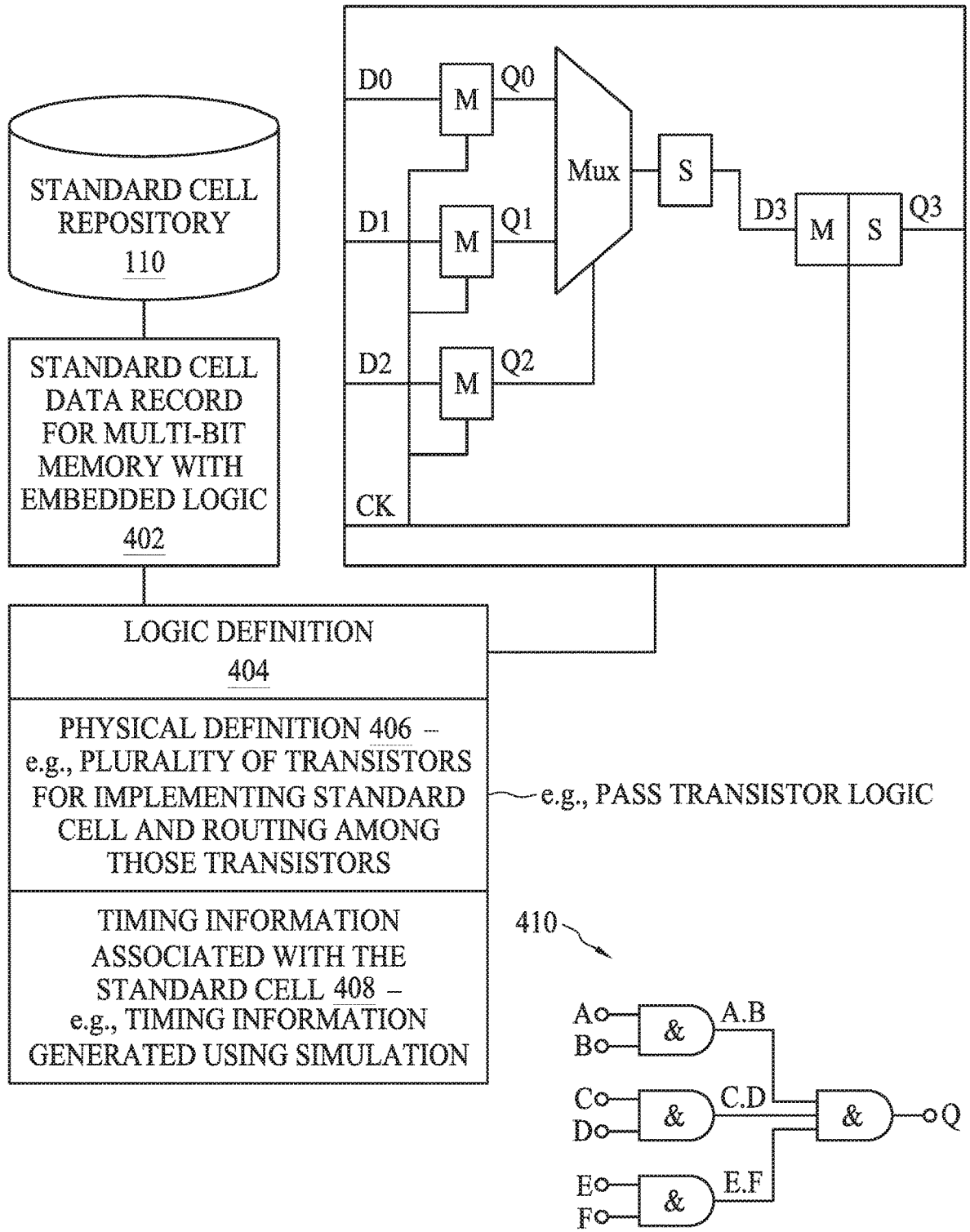
FIG. 4 is a diagram depicting a standard cell data record in accordance with embodiments of the disclosure.

FIG. 4 is a diagram depicting a standard cell data record in accordance with embodiments of the disclosure. A standard cell repository 110 includes a plurality of data records 402, each being associated with a standard cell, such as multi-bit memories with embedded logic as described herein. A standard cell data record 402 can store and provide a variety of data, which may be stored in fields of the data record. For example, the data record 402 may include a logic definition 404 of the standard cell that describes the logical operation of that standard cell within an integrated circuit design. Logic of a standard cell may take a variety of forms (e.g., a single level of logic between input and output latches, multiple levels of logic as shown at 410). The logic definition 404 may describe the standard cell inputs (e.g., number, type, signal format (e.g., single ended, differential)), its logical operation (e.g., providing three data input signals to master latches based on a clock signal, providing output of two of the master latches to multiplexer inputs with the third master latch output being used as a selection signal, the multiplexer output being provided to a slave latch, with an output of the slave latch being provided to a master/slave flip flop), and outputs of the standard cell. The data record 402 may also include a physical definition 406 of hardware (e.g., transistors, signal routing among the transistors) for implementing the logic identified in the logic definition 404. The physical definition 406 may be developed iteratively using simulation to optimize performance, power, and area efficiency (e.g., using pass transistor logic while ensuring proper timing of the logic). In implementations, the data record 402 may further include timing information 408 associated with the standard cell, where that timing information 408 is generated using simulation of the standard cell.

With reference back to FIG. 2, the electronic design engine 102 may further include a circuit analysis and modification engine 204 that may operate alone or in concert with the circuit design user interface 202 to modify (e.g., improve, optimize) an integrated circuit design. For example, the circuit analysis and modification engine 204 may review an integrated circuit design 106 and identify portions of that design 106 that may be suboptimal. For example, where functionality implemented via multiple cells is present in the design 106 that could be implemented by a single standard cell from the repository 110, the circuit analysis and modification engine 204 may suggest replacement of the identified replaceable portion of the design 106 (e.g., based on a review performed periodically during a design, based on a review performed based on a user request/command) with a standard cell (e.g., in a semi-automatic method where that engine 204 iteratively identifies possible modifications and requests user instructions on whether to make the modification). Or in some implementations, the circuit analysis and modification engine 204 may be configured to automatically modify the circuit design 106 to substitute the standard cell for the replaceable portion.

Figure 5:
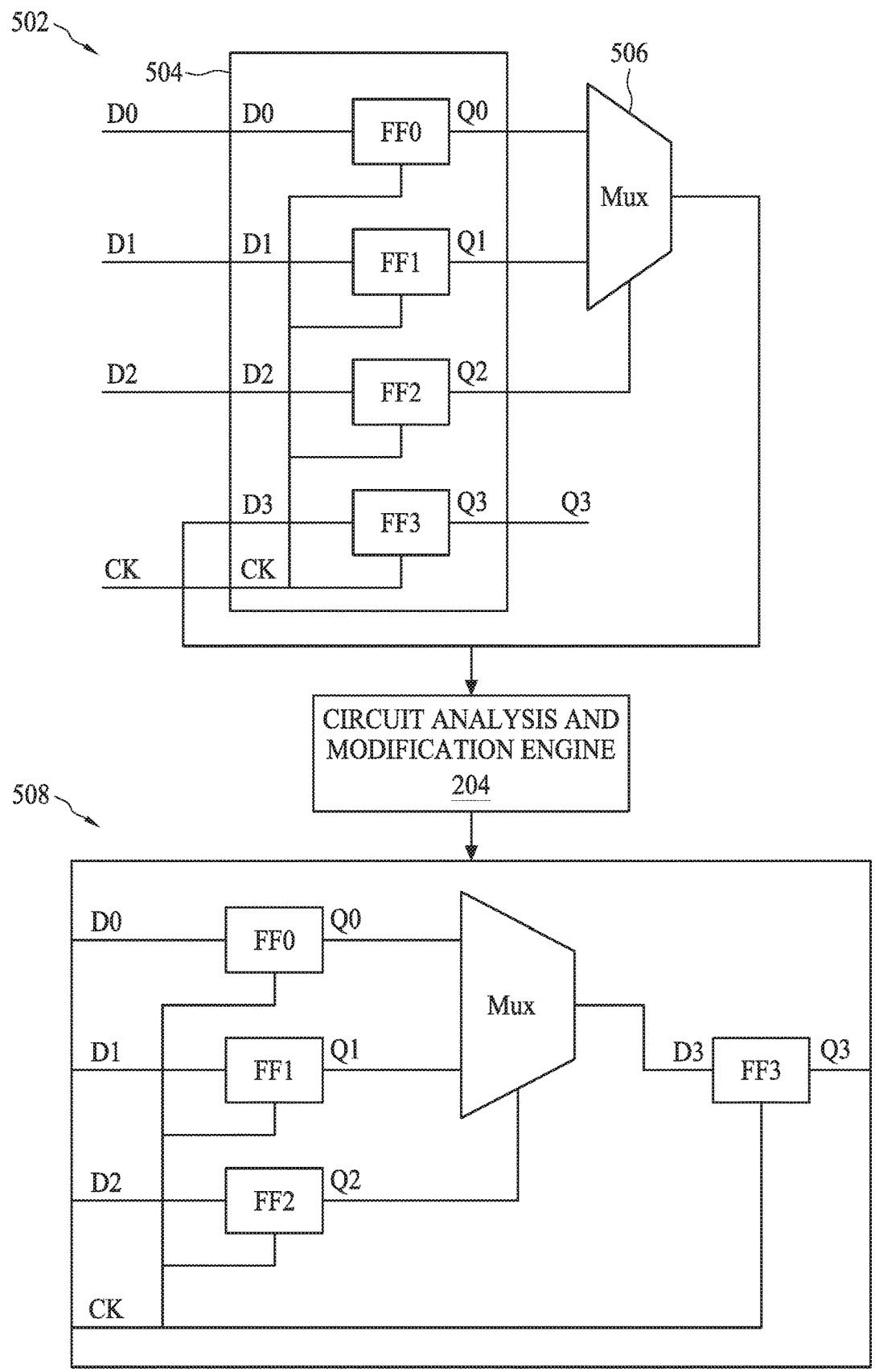
FIG. 5 is a diagram depicting example operation of a circuit analysis and modification engine in an embodiment.

FIG. 5 is a diagram depicting example operation of a circuit analysis and modification engine in an embodiment. A current version of a portion of an integrated circuit design is illustrated at 502. That portion includes a multi-bit flip flop standard cell 504 that includes multiple flip flops. Multi-bit flip flops share a clock network across multiple flip-flops, reducing dynamic and leakage power. In the example at 502, the multi-bit flip flop 504 is used along with a multiplexer 506 combinational gate to realize a pipe-stage of logic enclosed by state (e.g., storage) elements. Specifically, three flip flops FF0, FF1, FF2 of the multi-bit flip flop 504 standard cell receive inputs that are stored and used to control a multiplexer 506 standard cell. The output of the multiplexer 506 standard cell is provided to the fourth flip flop FF3 of the multi-bit flip flop standard cell 504 for output.

The circuit analysis and modification engine 204 analyzes a current version of the integrated circuit design 502 and provides automated circuit modifications (e.g., optimizations) or presents options for circuit modifications to a designer. For example, upon receiving the portion of the integrated circuit design depicted at 502, the circuit analysis and modification engine 204 determines that the standard cell at 508 may provide improved benefits (e.g., performance, power, area) in implementing the same logic. The standard cell at 508 utilizes three input flip flops FF0, FF1, FF2 to capture input data signals that are provided to a multiplexer, with the output of the multiplexer being received by a fourth flip flop FF3 that provides output from the standard cell.

Use of a single standard cell, as suggested by the circuit analysis and modification engine 204 in FIG. 5, can produce an integrated circuit with improved benefits. As noted above, the physical implementations of a standard cell (e.g., transistor arrangements, signal routing, timing) may be rigorously designed for optimal performance, power, and area characteristics. While the design at 502 does utilize standard cells, such that the designer can have confidence of the internal performance, power, and area considerations of the individual standard cells 504, 506 themselves, the block level connections (e.g., between cells 504 and 506, and back to 504) will be made during circuit synthesis, where time is typically more of the essence. That block level connectivity is typically verified using less rigorous timing analysis (e.g., static timing analysis rather than simulation), commonly resulting in more conservative designs that are less time and power efficient. Thus the circuit analysis and modification engine 204 may seek to minimize a total number of cells/standard cells in an integrated circuit design and/or the total number of pins that must be routed between blocks as part of its automated/semi-automated circuit modification.

With reference back to FIG. 2, the design engine 102 may further include a circuit synthesizer 206 that converts the integrated circuit design 106, which may be stored at a high level of abstraction (e.g., where cells and logic are represented by their function rather than underlying physical (e.g., transistor) implementation). The circuit synthesizer may convert that representation to a lower level of detail (e.g., converting flip flops to their component master and slave latches, converting to a netlist (e.g., a list of electronic components in a circuit and a list of the nodes they are connected to)). In performing that conversion, the synthesizer may modify the circuit design 106 (e.g., optimize) to produce a modified design, such as a production integrated circuit design 104 for fabricating an integrated circuit.

Figure 6:
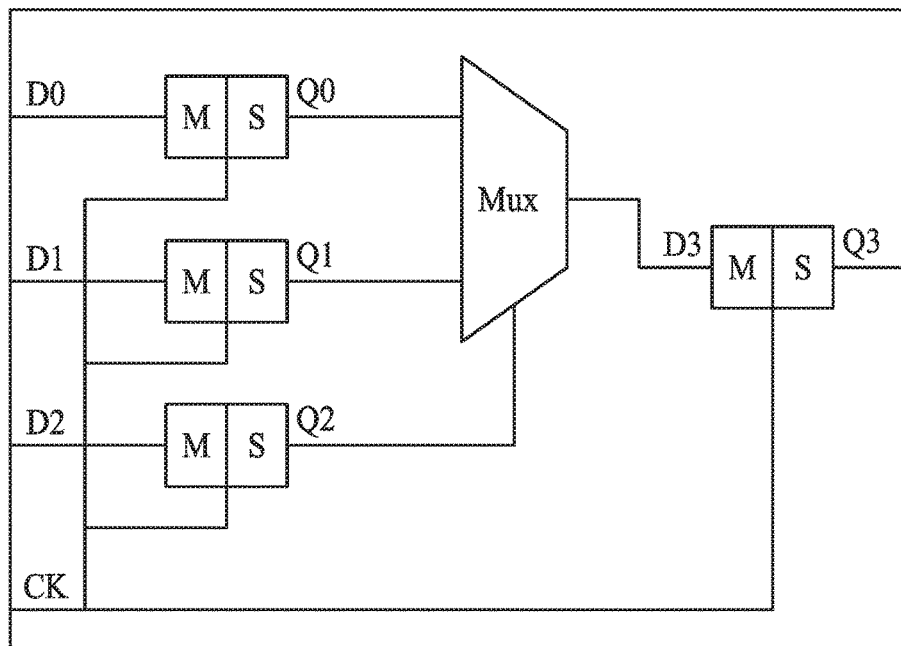
FIG. 6 is a diagram depicting a circuit synthesizer modifying an integrated circuit design in an embodiment of the disclosure.
Figure 6:
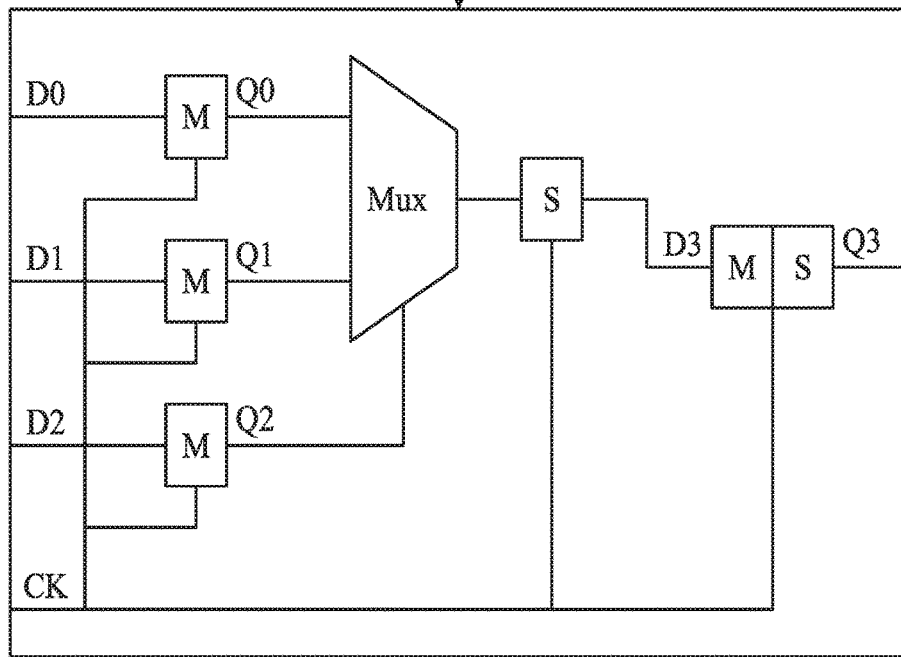

For example, the circuit synthesizer 206 may modify an integrated circuit design to reduce the number of components in a design to increase power efficiency, reduce area, and/or increase circuit speed performance. FIG. 6 is a diagram depicting a circuit synthesizer modifying an integrated circuit design in an embodiment of the disclosure. The circuit synthesizer 206 receives all or a portion of an integrated circuit design at 602. That design 602 includes an embedded logic multi-bit flip flop with a multiplexer as the embedded logic. Each flip flop in this design 602 includes a first stage master (M) latch and a second stage slave (S) latch. Upon review of the circuit design 602, the circuit synthesizer 206 determines that the design 602 can be modified to improve performance, power, and/or area, as indicated at 604. Specifically, the circuit synthesizer 206 deletes the slave latches (S) on the input flip flops and adds one slave latch (S) at the output of the embedded logic multiplexer. The logical function remains the same, but the optimization removes two latches from the circuit design (e.g., removes n−1 (2) latches where n (3) is equal to a count of the input flip flops), providing opportunities for fabricating an integrated circuit with less area, less power leakage (e.g., fewer components at which power can leak), less dynamic power usage (e.g., fewer components to which a clock network is connected).

Figure 7:
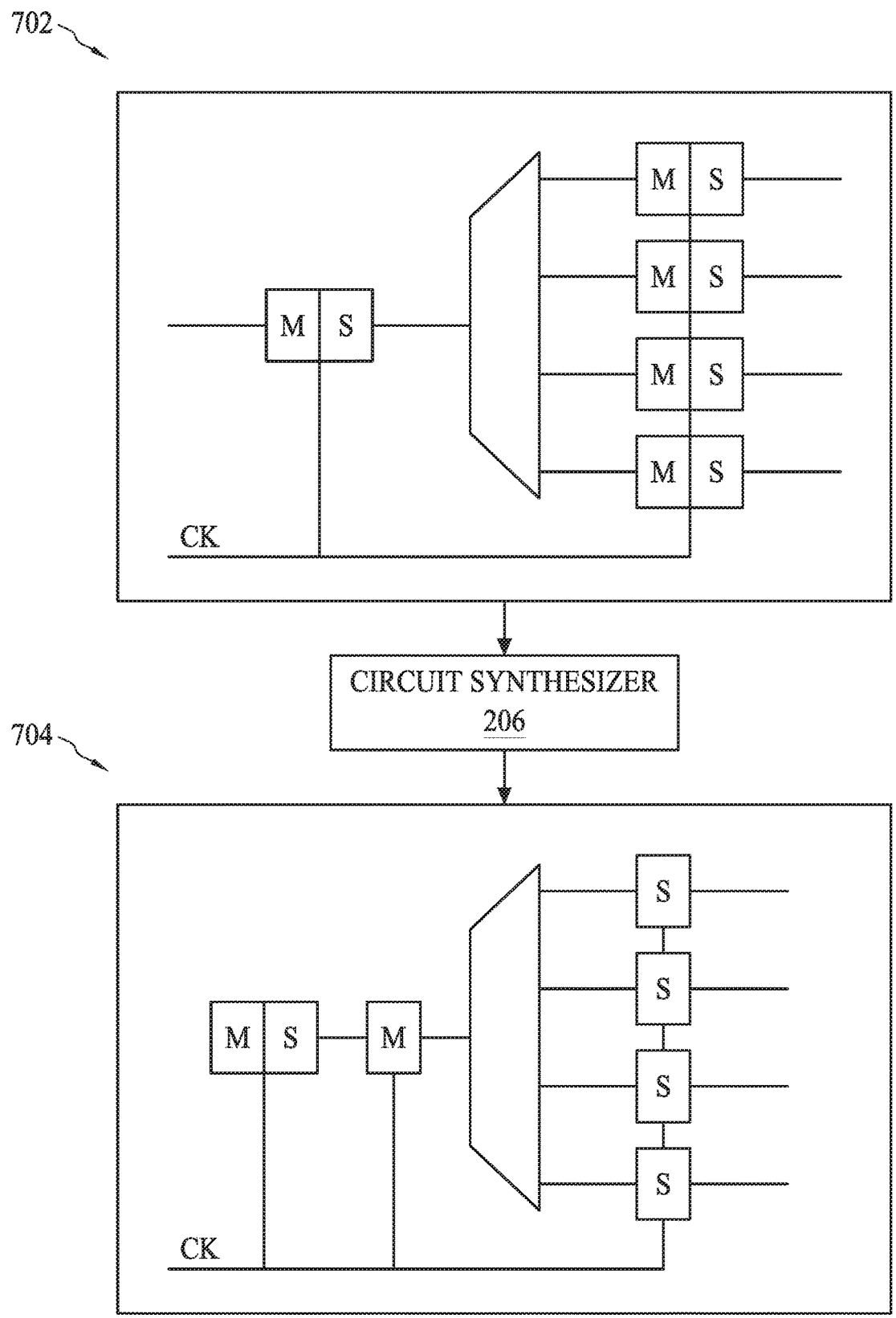
FIG. 7 depicts a circuit synthesizer performing an integrated circuit optimization where a demultiplexer is included as embedded logic in accordance with embodiments.

FIG. 7 depicts a circuit synthesizer performing an integrated circuit optimization where a demultiplexer is included as embedded logic in accordance with embodiments. In the example of FIG. 7, the circuit synthesizer 206 receives and analyzes the circuit design at 702, where one or more logic functions (a demultiplexer) is positioned between a single first data storage element (M+S) at the input and multiple data storage elements (M+S) at the output. The circuit synthesizer 206 automatically modifies the design (or presents the modification as an option to a designer) to delete the first stages (M) of the four output latches, position a first stage (M) between an input data storage element and the demultiplexer, and route the output of the demultiplexer directly to second stages (S) of the plurality of second data storage elements at 704. This optimization reduces the latch count by m−1 (3) latches, where m (4) is equal to the number of output data storage elements in the integrated circuit design.

Figure 8:
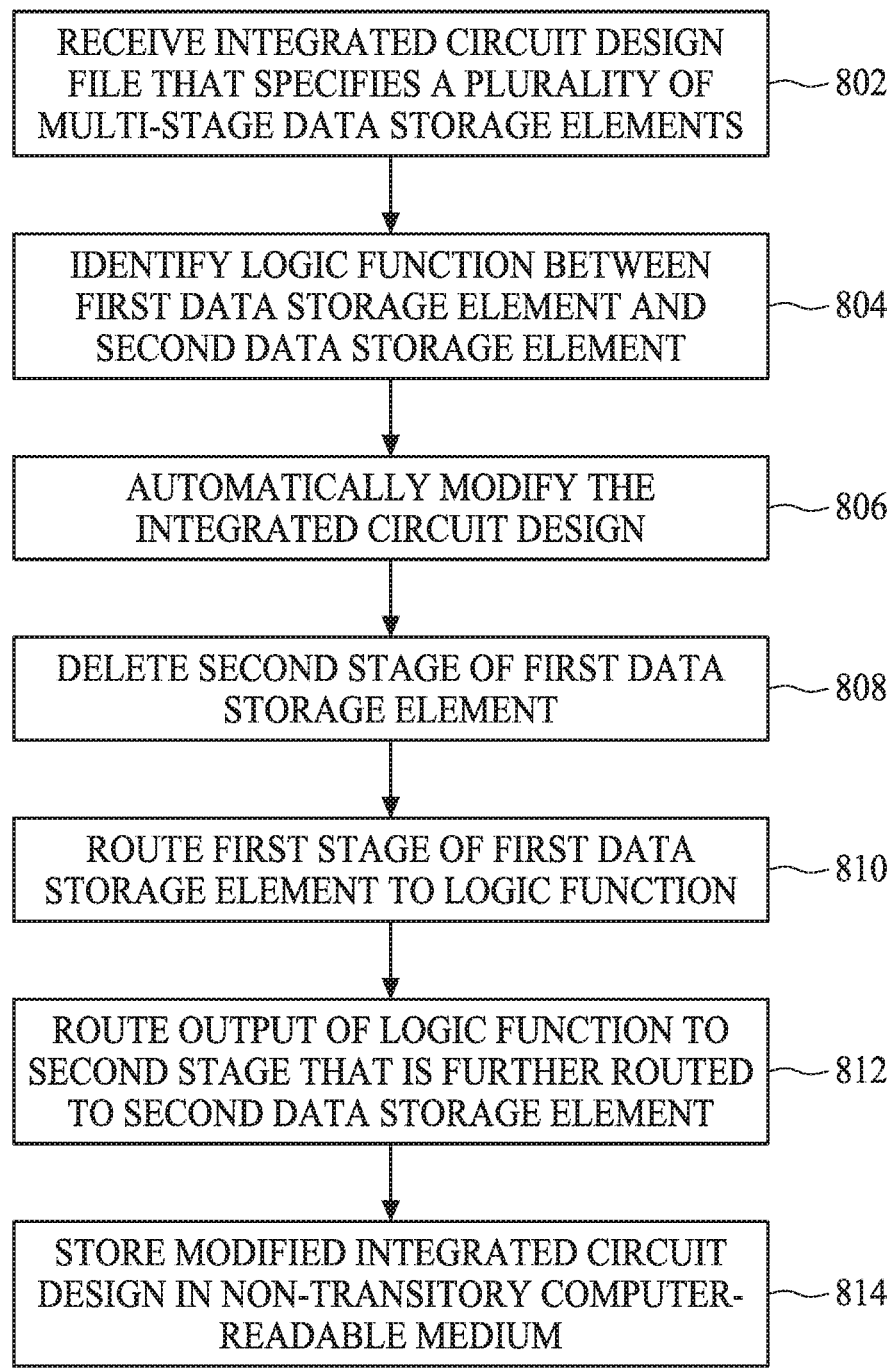
FIG. 8 is a flow diagram depicting a method for automating design of an integrated circuit in accordance with an embodiment.

FIG. 8 is a flow diagram depicting a method for automating design of an integrated circuit in accordance with an embodiment. For ease of understanding, this method is described with reference to structures previously described herein. But it is understood that this method is applicable to other structures as well. An integrated circuit design file 106 is received at 802 that specifies a plurality of multi-stage data storage elements (Master-Slave latches of FIG. 6 at 602). One or more logic functions (FIG. 6 MUX) are identified at 804 positioned between a first data storage element (M/S at D0) and a second data storage element (M/S at D3). The integrated circuit design is automatically modified at 806 by deleting a second stage of the first data storage element (Slave latch at D0) in the integrated circuit design at 808; routing a first stage of the first data storage element (Master latch at D0) to the one or more logic functions (MUX) at 810; and routing output of the one or more logic functions (MUX) to a second stage (Slave latch before D3) that is further routed to the second data storage element (M/S at D3) at 812. The modified integrated circuit design is stored in a non-transitory computer-readable medium at 814.

Figure 9:
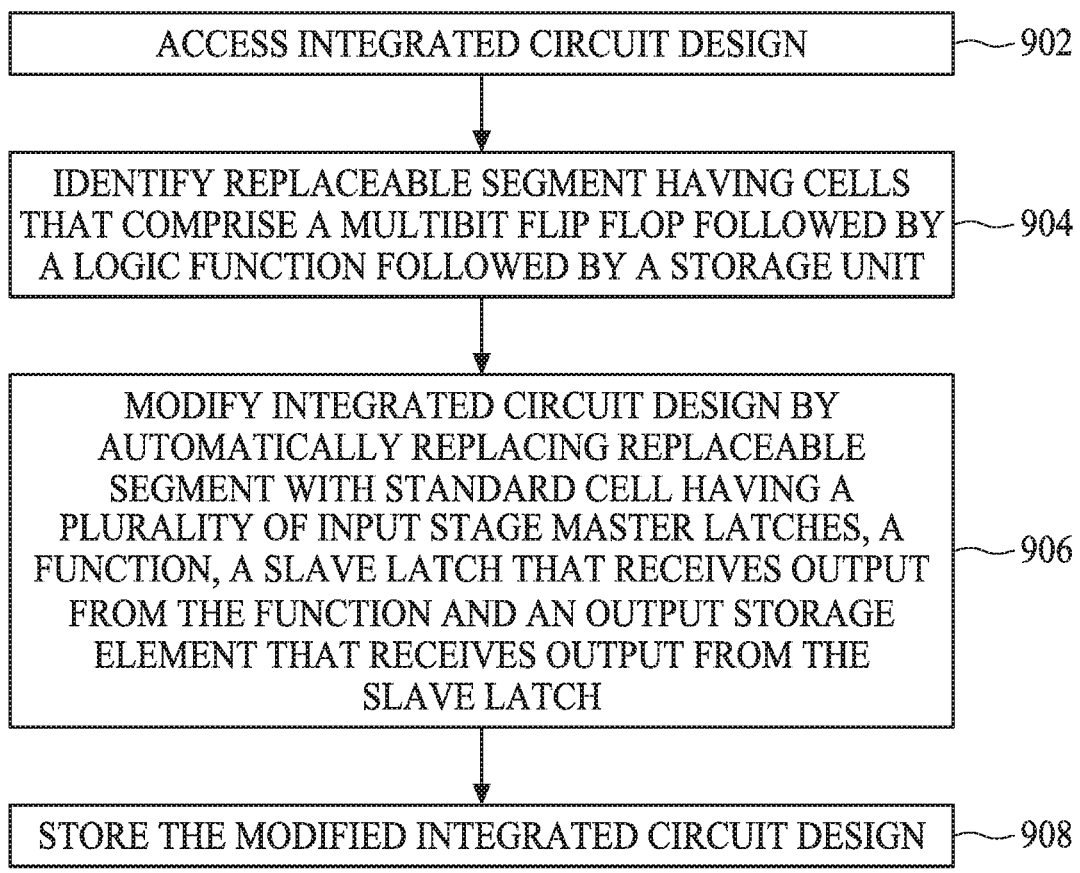
FIG. 9 is a flow diagram depicting a method for optimizing a circuit design in accordance with an embodiment.

FIG. 9 is a flow diagram depicting a method for optimizing a circuit design in accordance with an embodiment. For ease of understanding, this method is described with reference to structures previously described herein. But it is understood that this method is applicable to other structures as well. The method includes accessing an integrated circuit design (602) at 902 and identifying a replaceable segment of the integrated circuit design having cells that comprise a multibit flip flop (FIG. 6 Master-Slave latches at D0, D1, D2) followed by a logic function (MUX) followed by a storage unit (Master-Slave latch at D3) at 904. At 906, the integrated circuit design is modified by automatically replacing the components of the replaceable segment with a standard cell that comprises: a plurality of input stage master latches (M at D0, D1, D2); a function that replicates operation of the logic function (MUX) that receives output from the plurality of input stage master latches (M at D0, D1, D2); a slave latch (S at MUX output) that receives output from the logic function (MUX); and an output storage element (Master-Slave at D3) that receives output from the slave latch. The modified integrated circuit design is stored at 908 in a non-transitory computer-readable medium.

Embedded logic multi-bit flip flops as described herein may take a variety of forms. For example, in one embodiment, all inputs to the combinational logic (e.g., 304) may be provided to a storage element (e.g., a flip flop) before reaching the combinational logic. In other examples, one or more inputs to the combinational logic may not be received by a storage element prior to reaching the combinational logic. For example, in an embodiment like that of FIG. 6, where the combinational logic is a multiplexer, one or more of the inputs (D0, D1, D2) may not be provided to a flip flop as depicted (e.g., selection input D2 may be provided directly to the multiplexer from input D2).

Figure 10:
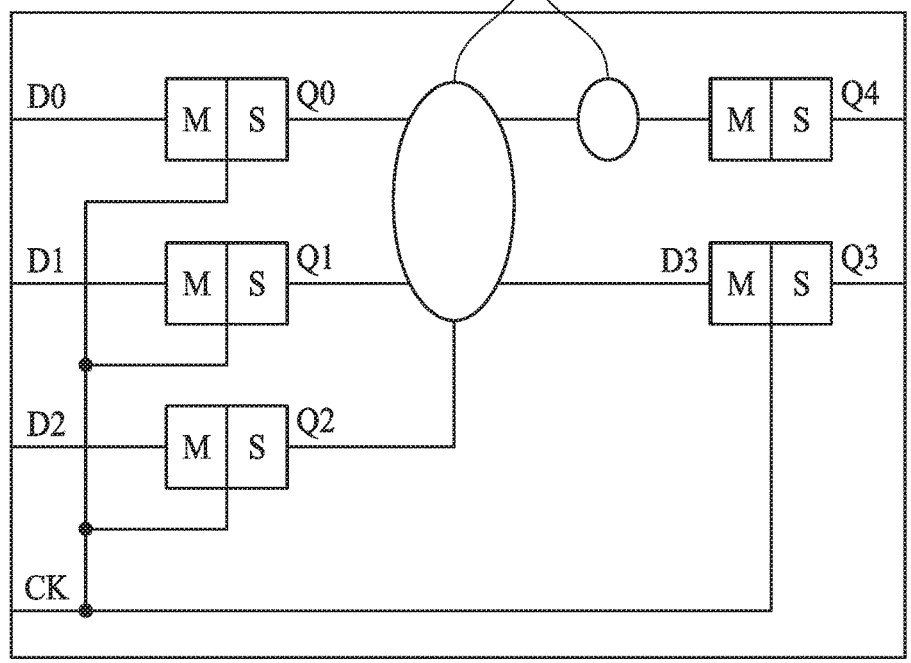
FIG. 10 is depicts an additional circuit synthesizer modification example in an embodiment of the disclosure.
Figure 10:
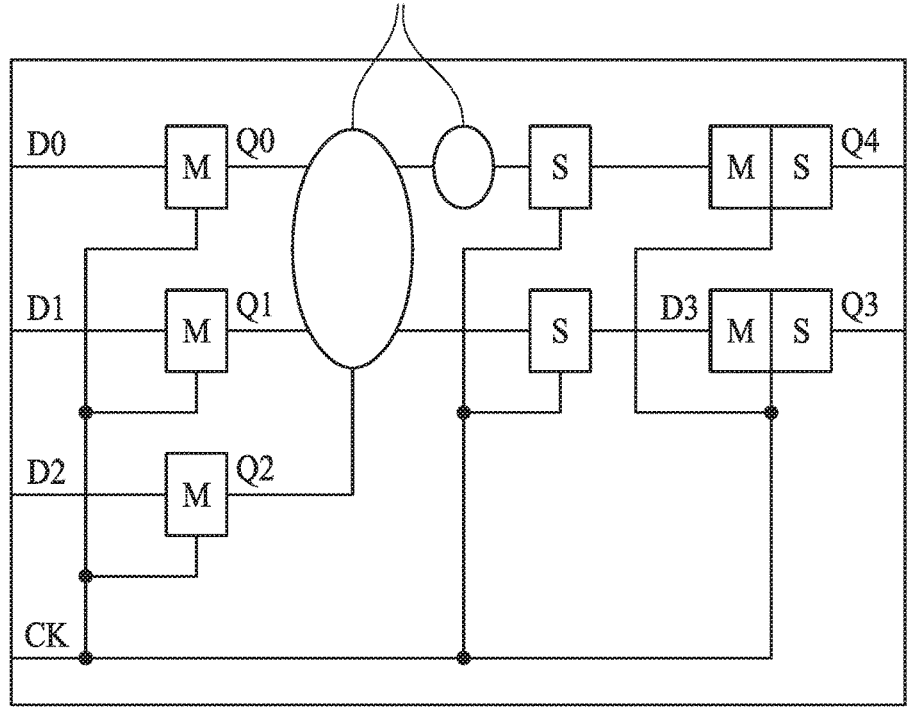

Optimizations as described herein may take a wide variety of forms. For example, FIG. 10 is depicts an additional circuit synthesizer modification example in an embodiment of the disclosure. The circuit synthesizer 206 receives all or a portion of an integrated circuit design at 1002. That design 1002 includes an embedded logic multi-bit flip flop with multiple layers of combinational logic in the embedded logic, with multiple outputs Q3, Q4 at the output. Each flip flop in this design 1002 includes a first stage master (M) latch and a second stage slave (S) latch. Upon review of the circuit design 1002, the circuit synthesizer 206 determines that the design 1002 can be modified to improve performance, power, and/or area, as indicated at 1004. Specifically, the circuit synthesizer 206 deletes the three slave latches (S) on the input flip flops and adds two slave latches (S) at the output of the embedded logic. The logical function remains the same, but the optimization removes one latches from the circuit design, providing opportunities for fabricating an integrated circuit with less area, less power leakage, less dynamic power usage.

Figure 11:
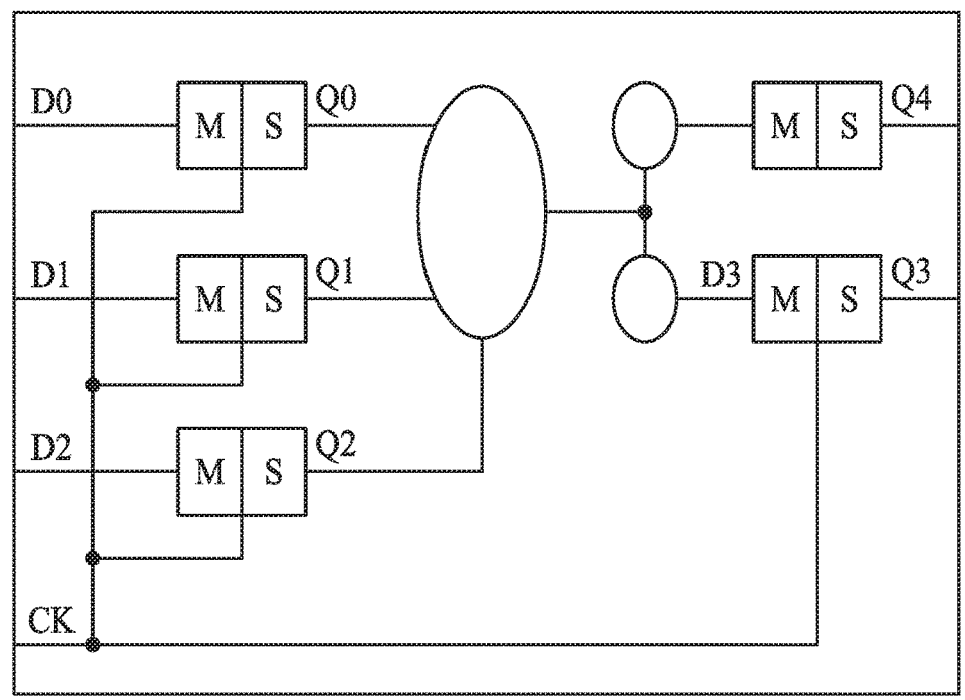
FIG. 11 is depicts a further circuit synthesizer modification example in an embodiment of the disclosure.
Figure 11:
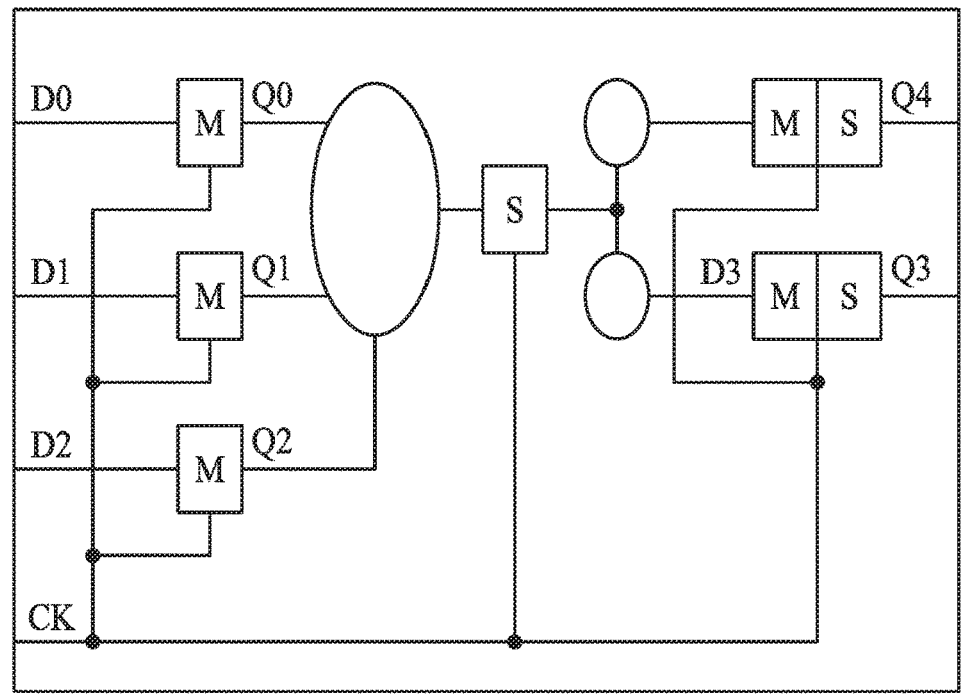

FIG. 11 is depicts a further circuit synthesizer modification example in an embodiment of the disclosure. The circuit synthesizer 206 receives all or a portion of an integrated circuit design at 1102. That design 1102 includes an embedded logic multi-bit flip flop with multiple layers of combinational logic in the embedded logic, with multiple outputs Q3, Q4 at the output. Each flip flop in this design 1102 includes a first stage master (M) latch and a second stage slave (S) latch. Upon review of the circuit design 1102, the circuit synthesizer 206 determines that the design 1102 can be modified to improve performance, power, and/or area, as indicated at 1104. Specifically, the circuit synthesizer 206 deletes the three slave latches (S) on the input flip flops and adds one slave latch (S) at a diverging point between layers in the output of the embedded logic. The logical function remains the same, but the optimization removes two latches from the circuit design, providing opportunities for fabricating an integrated circuit with less area, less power leakage, less dynamic power usage.

Figure 12A:
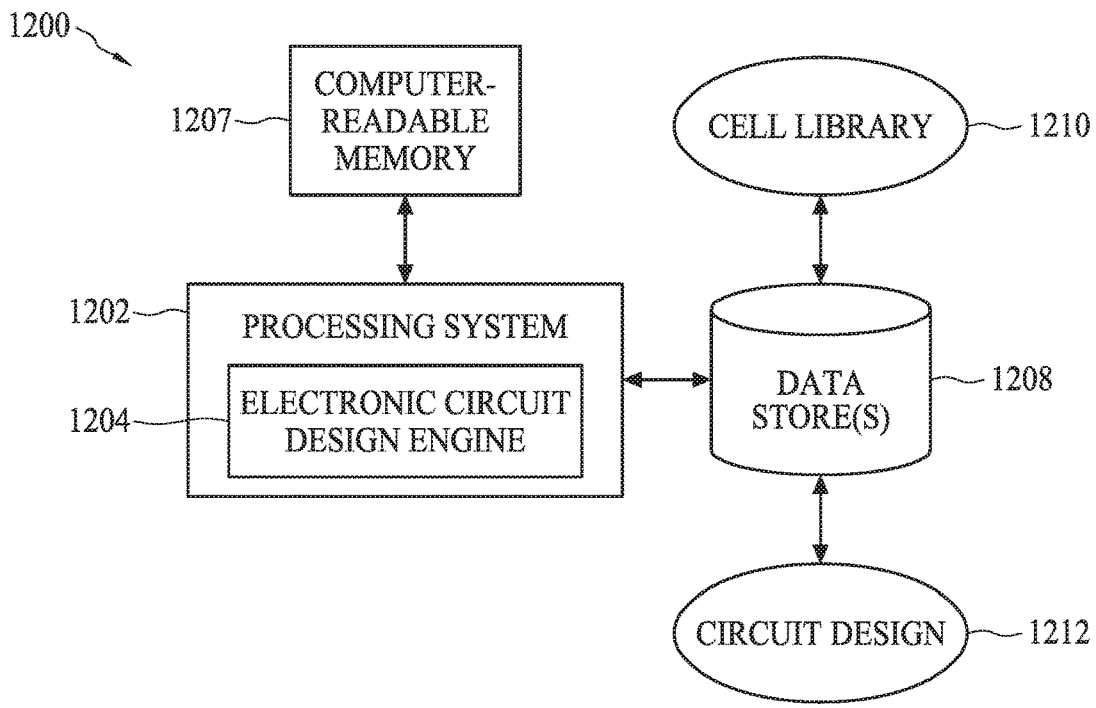
FIGS. 12A, 12B, and 12C depict example systems for implementing the approaches described herein for designing integrated circuits.
Figure 12B:
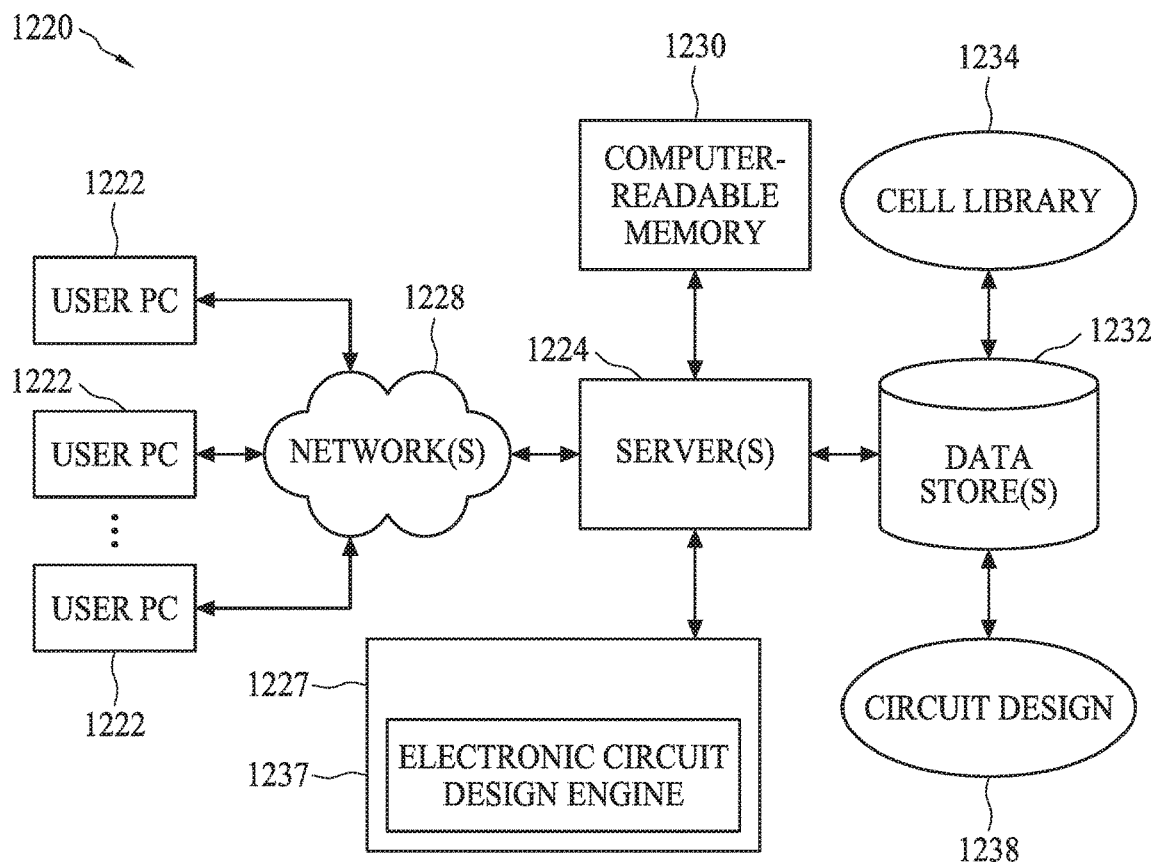
Figure 12C:
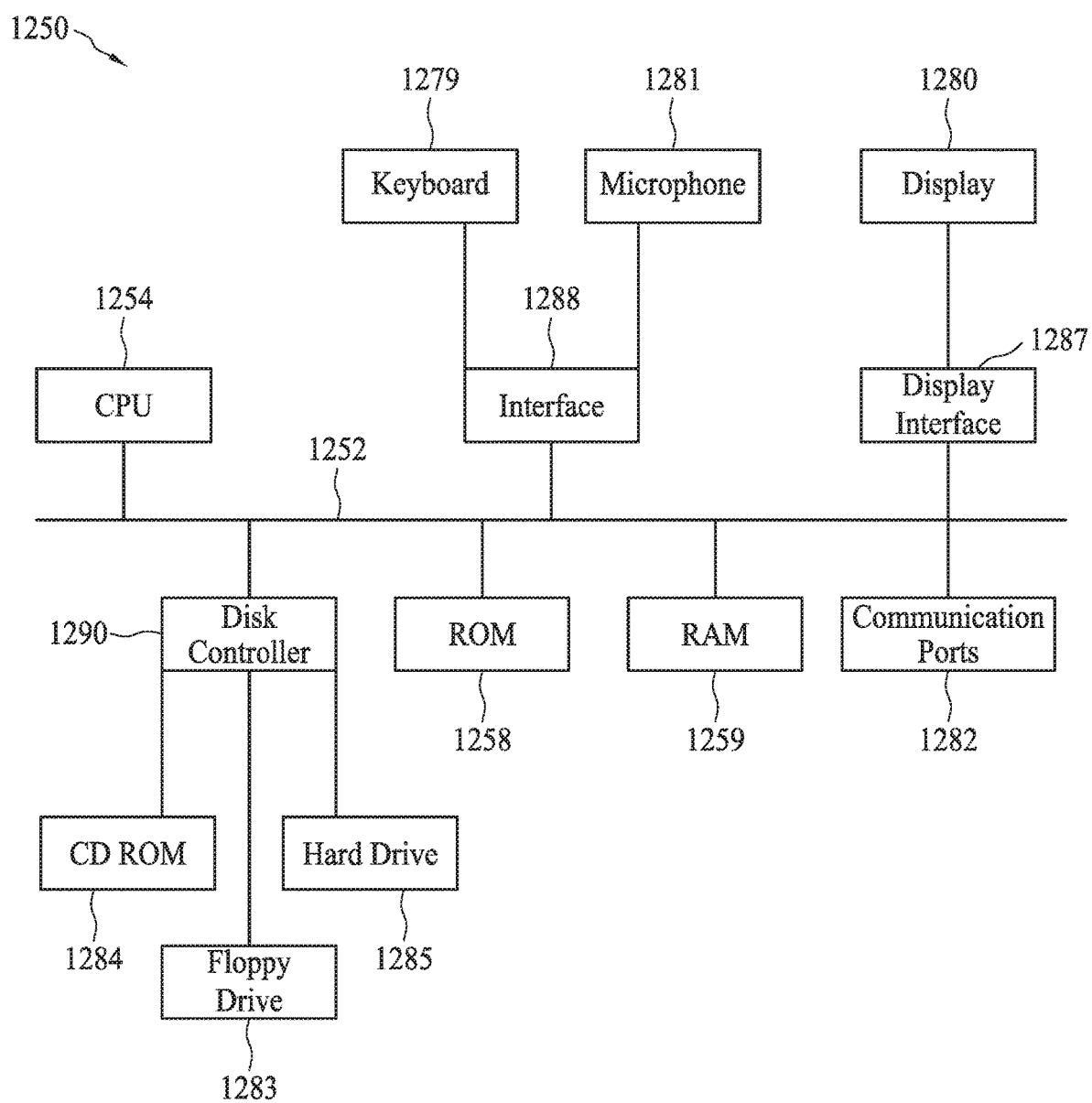

FIGS. 12A, 12B, and 12C depict example systems for implementing the approaches described herein for designing integrated circuits. For example, FIG. 12A depicts an exemplary system 1200 that includes a standalone computer architecture where a processing system 1202 (e.g., one or more computer processors located in a given computer or in multiple computers that may be separate and distinct from one another) includes a computer-implemented electronic circuit design engine 1204 being executed on the processing system 1202. The processing system 1202 has access to a computer-readable memory 1207 in addition to one or more data stores 1208. The one or more data stores 1208 may include a cell library database 1210 as well as a circuit design database 1212. The processing system 1202 may be a distributed parallel computing environment, which may be used to handle very large-scale data sets.

FIG. 12B depicts a system 1220 that includes a client-server architecture. One or more user PCs 1222 access one or more servers 1224 running an electronic circuit design engine 1237 on a processing system 1227 via one or more networks 1228. The one or more servers 1224 may access a computer-readable memory 1230 as well as one or more data stores 1232. The one or more data stores 1232 may include a cell library database 1234 as well as a circuit design database 1238.

FIG. 12C shows a block diagram of exemplary hardware for a standalone computer architecture 1250, such as the architecture depicted in FIG. 12A that may be used to include and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1258 and random access memory (RAM) 1259, may be in communication with the processing system 1254 and may include one or more programming instructions for performing the method of designing an integrated circuit. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 1207, 1230, 1258, 1259 or data stores 1208, 1232, 1283, 1284, 1285 may include one or more data structures for storing and associating various data used in the example systems for designing an integrated circuit. For example, a data structure stored in any of the aforementioned locations may be used to store data from XML files, initial parameters, and/or data for other variables described herein. A disk controller 1290 interfaces one or more optional disk drives to the system bus 1252. These disk drives may be external or internal floppy disk drives such as 1283, external or internal CD-ROM, CD-R, CD-RW or DVD drives such as 1284, or external or internal hard drives 1285. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1290, the ROM 1258 and/or the RAM 1259. The processor 1254 may access one or more components as required. A display interface 1287 may permit information from the bus 1252 to be displayed on a display 1280 in audio, graphic, or alphanumeric format. Communication with external devices may optionally occur using various communication ports 1282. In addition to these computer-type components, the hardware may also include data input devices, such as a keyboard 1279, or other input device 1281, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

According to some embodiments, a method for automating design of an integrated circuit is provided. An integrated circuit design file is received that specifies a plurality of multi-stage data storage elements. One or more logic functions are identified positioned between a first data storage element and a second data storage element. The integrated circuit design is automatically modified by deleting a second stage of the first data storage element in the integrated circuit design; routing a first stage of the first data storage element to the one or more logic functions; and routing output of the one or more logic functions to a second stage that is further routed to the second data storage element. The modified integrated circuit design is stored in a non-transitory computer-readable medium.

In embodiments, a computer-readable medium is encoded with a cell library containing data associated with a plurality of standard cells for performing electronic design automation. The cell library includes a standard cell data record comprising a logic definition that include a plurality of input stage master latches, each input stage master latch receiving a clock signal; a logic function that receives output from the plurality of input stage master latches; a slave latch that receives output from the logic function, the slave latch receiving a timing signal based on the clock signal; and an output storage element that receives output from the slave latch. The standard cell data record further includes a physical definition comprising identification of a plurality of transistors for implementing a cell associated with the standard cell data record and routing among the plurality of transistors and timing information associated with the standard cell, wherein the timing information is generated via simulation.

In certain embodiments, a method for optimizing a circuit design includes accessing an integrated circuit design and identifying a replaceable segment of the integrated circuit design having cells that comprise a multibit flip flop followed by a logic function followed by a storage unit. The integrated circuit design is modified by automatically replacing the components of the replaceable segment with a standard cell that comprises: a plurality of input stage master latches; a function that replicates operation of the logic function that receives output from the plurality of input stage master latches; a slave latch that receives output from the logic function; and an output storage element that receives output from the slave latch. The modified integrated circuit design is stored in a non-transitory computer-readable medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for optimizing a design, comprising:
   accessing a model of the design;
   using the model to identify a replaceable segment of the design, based on an identification of multibit first storage followed by a logic function followed by second storage;
   modifying the design by automatically replacing the components of the replaceable segment with a standard cell that comprises:

a plurality of input stage master latches;
a function that replicates operation of the logic function that receives output from the plurality of input stage master latches;
a slave latch that receives output from the logic function; and
an output storage element that receives output from the slave latch; and
storing the modified design in a non-transitory computer-readable medium.

2. The method of claim 1, wherein the model of the design comprises a register transfer-level specification of the design.

3. The method of claim 1, wherein the model of the design comprises a netlist.

4. The method of claim 1, further comprising synthesizing an integrated circuit, wherein the synthesizing comprises:
routing an input signal for each input stage master latch from upstream cells to the standard cell; and
routing an output signal from the output storage element to a downstream cell.

5. The method of claim 4, wherein the synthesizing does not include routing signals within the replaceable segment from a multibit flip flop to the logic function and further does not include routing signals within the replaceable segment from the logic function to the second storage.

6. The method of claim 1, wherein the replaceable segment comprises a plurality of standard cells, wherein said replacing reduces a total number of standard cells of the design.

7. The method of claim 1, wherein the replaceable segment does not include pass transistor logic, and wherein the standard cell include the pass transistor logic.

8. A method of automating design of an integrated circuit, comprising:
receiving an integrated circuit design file that specifies a plurality of multi-stage data storage elements;
identifying one or more logic functions positioned between a first data storage element and a second data storage element;
automatically modifying the integrated circuit design by:
deleting a second stage of the first data storage element in the integrated circuit design;
routing a first stage of the first data storage element to the one or more logic functions; and
routing output of the one or more logic functions to a second stage that is further routed to the second data storage element; and
storing the modified integrated circuit design in a non-transitory computer-readable medium.

9. The method of claim 8, wherein a physical integrated circuit is fabricated based on the modified integrated circuit design.

10. The method of claim 8, wherein the first data storage element is a flip flop.

11. The method of claim 8, wherein the first stage of the flip flop is a master stage, and wherein the second stage of the flip flop is a slave stage.

12. The method of claim 8, wherein the one or more logic functions are positioned between multiple first data storage elements and a second data storage element;
wherein the automatically modifying comprises:
deleting second stages of each of the first data storage elements;
routing first stages of the first data storage elements to the one or more logic functions;
wherein routing output of the one or more logic functions to the single second stage that is further routed to the second data storage element.

13. The method of claim 12, wherein the one or more logic functions comprise a multiplexer, wherein the received integrated circuit design specifies the multiple first data storage elements as providing input to the multiplexer, and wherein the multiplexer output is provided to the second data storage element.

14. The method of claim 8, wherein the modified integrated circuit design includes (n−1) fewer second stages, wherein n is equal to a count of the multiple first data storage elements.

15. The method of claim 8, wherein the second data storage element is a flip flop comprising a master stage and a slave stage, wherein output of the second stage that receives the output of the one or more logic functions is routed to the master stage of the flip flop.

16. The method of claim 8 wherein timing signals are provided to the first stage, the second stage, and the second data storage element based on a clock signal.

17. The method of claim 8, wherein the one or more logic functions are positioned between the first data storage element and multiple second data storage elements;
wherein outputs of the one or more logic functions are routed directly to second stages of the plurality of second data storage elements following removal of first stages of the plurality of second data storage elements.

18. The method of claim 17, wherein the one or more logic functions includes a demultiplexer.

19. A computer-readable medium encoded with a cell library containing data associated with a plurality of standard cells for performing electronic design automation, the cell library comprising:
a standard cell data record, comprising:
a logic definition that includes:
a plurality of input stage master latches, each input stage master latch receiving a clock signal;
a logic function that receives output from the plurality of input stage master latches;
a slave latch that receives output from the logic function, the slave latch receiving a timing signal based on the clock signal; and
an output storage element that receives output from the slave latch;
a physical definition comprising identification of a plurality of transistors for implementing a cell associated with the standard cell data record and routing among the plurality of transistors; and
timing information associated with the standard cell, wherein the timing information is generated via simulation.

20. The computer-readable medium of claim 19, wherein the output storage element is a flip flop that receives a second timing signal based on the clock signal.

* * * * *